2,729,641

TETRAHYDROFORMYLPTERINS AND
PREPARATION OF THE SAME

John A. Brockman, Jr., Pearl River, N. Y., and Barbara Roth, Middlesex Borough, N. J., assignors to American Cyanamid Company, New York, N. Y., a corporation of Maine No Drawing. Application April 29, 1950,
Serial No. 159,151

8 Claims. (Cl. 260—251.5)

This invention relates to new substances having biological activity and to processes of preparing the same.

In 1948 Sauberlich and Baumann, Journal of Biological Chemistry, 176, page 165 (1948), recognized the existence of a substance that stimulated the growth in a synthetic medium of *Leuconostoc citrovorum*. This unknown substance was found to be present in commercial liver extracts and also in liver and a wide variety of natural materials. Subsequent work has shown that the growth factor was not pteroylglutamic acid, vitamin B12, or any of the other previously identified vitamins that occur in liver and other natural products. It has also been subsequently found that the unknown substance can replace the folic acid requirement of micro-organisms and chicks. It has further been found that the growth factor will reverse the action of pteroylglutamic acid antagonists and, surprisingly, will reverse the toxic effects of aminopterin (N-[4-{[(2,4 - diamino-6-pyrimido-[4,5-b]pyrazyl)methyl]amino}benzoyl]glutamic acid) in mice and bacteria, under conditions in which pteroylglutamic acid is ineffective.

The *citrovorum* factor exists in natural products in extremely minute quantities so that its recovery therefrom is exceedingly difficult and practically impossible from a commercial point of view. However, we have discovered that it is possible to prepare compounds having the same or related biological activity by a process which makes the production of adequate amounts of the activity a commercial possibility so that it may be used in medicine. Since the chemical structure of the *Leuconostoc citrovorum* growth factor described by Sauberlich et al. has not been elucidated as yet, it is not possible to say at this time whether any of the products produced by the process described hereinafter are the same or not, even though they have the same biological activity. Insofar as we are aware, however, the products covered by the present invention are new.

The new compounds of the present invention may be prepared by hydrogenation or chemical reduction of certain known compounds which have been previously prepared and some of which have been described in the literature. The starting materials that may be used in the process of the present invention to prepare the new compounds include formyl pteroic acid and its salts and amino acid amides, particularly N-[4-{[(2-amino-4-hydroxy-6-pyrimido[4,5-b]pyrazyl)methyl]formamido}benzoyl]glutamic acid. This latter compound may be made by several methods including that described by Gordon et al. in the Journal of the American Chemical Society, 70, page 878 (1948). By this method formylpteroylglutamic acid is prepared by heating 98% formic acid and acetic anhydride with folic acid (pteroylglutamic acid) for one hour at 100° C. The volatile reactants are removed under vacuum and a light yellow product is precipitated from an alkaline solution by acetic acid. Other formyl derivatives of pteroic acid and its amino acid amides may be prepared by the same general process. In addition to the above, we may also use the corresponding derivatives of aminopterin, which vary structurally only in having an amino radical in the 4-position on the pyrimido ring.

The above compounds may be represented by the following general formula:

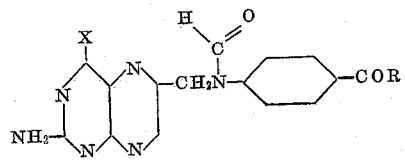

in which R is a hydroxy group or a radical of an amino acid, preferably glutamic acid, or a peptide of glutamic acid such as glutamylglutamic acid, glutamylglutamylglutamic acid, hexaglutamylglutamic acid, or the like. The amino acid radical may however be of another amino acid such as aspartic acid, glycine, alanine, serine, or the like. X represents the radical OH, NH₂ or NHR₁, in which R₁ is an alkyl group such as methyl, ethyl, etc. Of course, the salts of the compounds illustrated by the general formula above may be used in the process if desired.

The reduction of the formyl compounds with two mols of hydrogen by which the new products of the present invention are prepared may be conducted either with or without the aid of catalysts. When using a catalytic reduction a wide variety of solvents may be used in the process, including formic acid, alcohol, glycol, acetic acid, dimethylformamide, or mixtures of these with water, and others, depending, of course, upon the nature of the catalytic agent. The temperature of the reduction may occur over wide range of temperatures from about −20° C. to about 150° C. The preferred temperature range is from 0° C.–50° C.

In our copending application, Serial Number 153,294, filed March 31, 1950, of which the present application is a continuation-in-part, we described the structure of the new compounds produced by reduction of the formyl compounds as having two additional hydrogen atoms and as having one of two structural formulas. Upon reduction of the same starting materials with two mols of hydrogen, as in the present application, it is believed that the compounds obtained may be represented by one of the following formulae:

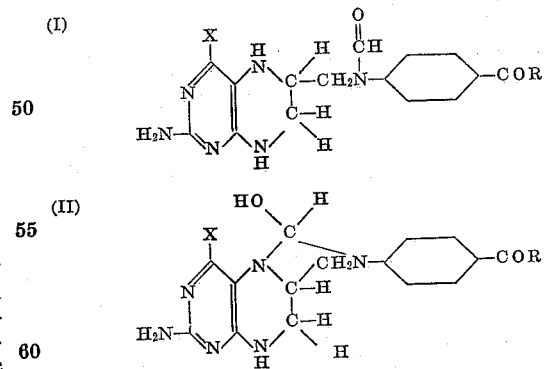

In these, X and R are as defined above. It will also be understood that the above may exist in tautomeric forms depending upon the conditions in which they are present. Both forms illustrated above where X is an OH radical may be regarded as reduced formyl pteroic derivatives which may exist in the open (I) or closed (II) tautomeric form.

Many different reduction catalysts may be employed in the process such as platinum, palladium and Raney nickel with or without an inert support such as charcoal, and several of these are illustrated in the specific examples which follow:

Generally speaking, the reaction occurs quite rapidly and appreciable yields of the desired product can be obtained in as little time as 10 minutes at room temperature using, for example, platinum in formic acid. Usuallly the reduction is carried out within a period of from 30 minutes to two hours.

Although specific examples of catalytic reduction are given hereinafter, a generally preferred procedure of preparing the new compounds of the present invention is as follows. In this, the starting material is pterolyglutamic acid or pteroic acid, or an amide thereof. This material is first formylated by heating in 20 parts of 90–100% formic acid for 30 minutes to one hour at 80–95° C. The formyl compound thus prepared may be isolated if desired and the reduction completed in a different solvent. However, it is generally more convenient to continue the reduction by cooling the solution and adding the catalyst to the solution, after which two mols of hydrogen may be passed into the reaction mixture with shaking or stirring. In some cases, it may be advantageous to activate the catalyst with hydrogen before mixing with the formylated pteroylglutamic acid although this procedure is not necessary. The pressure of hydrogen in the reaction vessel may be from 1 to 100 atmospheres or more, but ordinarily 1 or 2 atmospheres pressure are sufficient to obtain a good yield. After the reduction, the catalyst is removed by filtration, the solution is buffered in aqueous sodium bicarbonate and the resulting solution is found to contain the active material. When desirable to remove the excess formic acid from the reduction solution after removal of the catalyst, the solution can be poured into ether and the insoluble active product isolated by filtration. Formic acid can also be removed by distillation or by absorption procedures.

The reduced formylpteroylglutamic acid prepared as described above may be obtained in the form of white to light yellow crystalline solid. The compound is stable in 0.1 N sodium hydroxide even when heated for thirty minutes at 100° C. In aqueous solution at pH 2 at room temperature it is unstable and is rapidly converted to a material having the same biological activity as pteroylglutamic acid with concomitant loss in activity for the *Leuconostoc citrovorum* organism. The active material is absorbed on various absorbing agents, such as charcoal at an acid pH and on activated magnesium silicate at weakly alkaline pH, and these may be used to purify the crude reaction products by chromatographic adsorption methods. In 0.1 N sodium hydroxide solution it exhibits an absorption maximum at about 275 to 285 m$\mu$. It is highly soluble in water at pH 3.5 to 4.0. It forms a barium salt insoluble in dilute aqueous alcohol. It is partially precipitated as the zinc salt at pH 6.8 to 7.0.

Representative processes of obtaining the biologically active materials of the present invention by reduction methods will now be described in the following examples.

*Example 1*

Twenty grams of pteroylglutamic acid (90%) is heated 45 minutes on the steam bath with 200 cc. of 90% formic acid. The solution is cooled, one gram of ascorbic acid and 0.5 gram of platinum oxide are added and the mixture is hydrogenated in a shaking apparatus under 35 lbs. pressure of hydrogen until approximately two mols of hydrogen per mol of pteroylglutamic acid taken are consumed. After the reduction is complete the catalyst is filtered off and the filtrate is kept under an atmosphere of nitrogen for 40 hours.

The formic acid reaction mixture is heated one hour on the steam bath, then cooled, and poured into about 2500 cc. of water containing 340 grams of sodium bicarbonate. Sodium hydroxide is added to adjust the pH to about 12 and the solution is heated ½ hour on the steam bath, cooled and neutralized to about pH 7. The volume at this point is about 2900 cc. 300 grams of magnesium silicate (Magnesol) powder is added to the solution to absorb impurities largely, stirred at room temperature for 15 minutes and then filtered. The filtrate is light yellow in color and the volume is 3100 cc. The filtrate is adjusted to pH 4 by addition of hydrochloric acid and acetic acid. 150 grams of activated charcoal is added to adsorb the active material largely and the mixture stirred 15 minutes at room temperature. The charcoal is filtered off and is washed well on the filter with distilled water. A colorless filtrate is obtained.

The active material is eluted from the charcoal by stirring for 15 minutes in a mixture of 500 cc. alcohol, 100 cc. 28% ammonia, and 400 cc. water. The charcoal is separated by filtration and washed well with aqueous alcoholic ammonia. The volume of yellow filtrate is 1120 cc. It is evaporated to dryness under reduced pressure under an atmosphere of nitrogen to yield a tan sirupy residue. This is triturated with absolute ethanol whereupon a light yellow solid is formed. It is filtered off, washed with ethanol, then with ether, dried 10 minutes at 50° C. and then in a vacuum desiccator. The yield is 2.9 grams.

The product is very soluble in water, and the aqueous solutions have a pale blue fluorescence. A sample of 0.2 gram is dissolved in 4 cc. of N/10 sodium hydroxide and the pH is adjusted to 12 by the addition of a few drops of 5 N sodium hydroxide. The solution is heated 45 minutes on the steam bath. The fluorescence persists. Under these conditions the starting material is hydrolyzed to a non-fluorescent compound. The solution is cooled and centrifuged from a small amount of insoluble material, then acidified at 0° C. to pH 3.8. A light yellow product precipitates which is filtered, washed with acetone and ethanol, and dried to yield 0.062 gram product. By lowering the pH of the filtrate to 3.3 at 0°, 0.015 gram more is obtained. The latter product obtained when assayed microbiologically with the organic *Leuconostoc citrovorum* 8081 contains 3–5 million units per mg. of activity.

The units of activity are determined by microbiological assay using the synthetic medium described by H. E. Sauberlich et a.l, J. Biological Chemistry (1948), 176 page 165 and the organism *Leuconostoc citrovorum* 8081; each unit of activity being arbitrarily taken as equivalent to 16.6 millimicrograms of a previous preparation as standard. This unit of activity as determined is approximately equal to twice the unit of activity defined by Sauberlich et al. which is that amount of material per ml. of culture medium necessary to support ½ maximal growth of the test organism.

*Example 2*

100 g. of 90% pteroylglutamic acid in 600 ml. of 90% formic acid is heated one hour on the steam bath. After cooling, 4 g. of platinum oxide catalyst is added and the mixture is reduced at room temperature until 2 mols of hydrogen are absorbed (2 hours). The platinum is filtered off and the solution allowed to stand overnight at room temperature. It is then heated one hour on the steam bath, cooled, and poured gradually into 9 liters of water containing 1300 g. sodium bicarbonate. Sodium hydroxide (50%) is then added to about 0.1 N concentration, and the solution is heated 30 minutes on the steam bath. After cooling, the mixture is acidified with acetic acid to pH 6.6. 900 g. of Magnesol (magnesium silicate) is added, the mixture stirred 15 minutes, and filtered, giving a yellow filtrate which retains most of the activity of the original solution. This is acidified to pH 4, and stirred for 20 minutes with 450 g. of Darco–G60 (activated charcoal), followed by filtration. The charcoal cake is washed well with water and then slurried in a mixture of 1500 cc. ethanol, 300 cc. 28% ammonia, and 1200 cc. of water. This is heated for 30 minutes on the steam bath with stirring, while bubbling in nitrogen gas. The hot mixture is filtered and washed with dilute alcoholic ammonia. The filtrate contains 70% of the original activity. This is concentrated to dryness under reduced pressure, giving a residue of 37 g. of material with a bioassay of 1.6 million units/mg. This is further purified as described in Example 1.

*Example 3*

Five grams of pterolyglutamic acid (90%) are heated for 45 minutes on a steam bath with 100 cc. of 90% formic acid. The solution is cooled to room temperature, 1.0 g. of platinum oxide is added and the mixture is reduced with hydrogen in a shaking clave until approximately 2.0 mols of hydrogen are taken up for each mol of pterolyglutamic acid taken. At this time the catalyst is filtered off and the reaction filtrate is divided in three parts.

*Part A.*—This part is poured into about 250 cc. of water containing sodium bicarbonate in an amount such that the resulting solution is at pH 7–8. The resulting solution assayed microbiologically contains 880,000 units of activity per ml.

*Part B.*—The second part is allowed to stand for 19 hours in the formic acid solution and is then treated similarly to Part A with sodium bicarbonate solution. The resulting solution assayed microbiologically contains 1,100,000 units of activity per ml.

*Part C.*—The third part is allowed to stand for 91 hours in the formic acid solution and is then treated similarly to Part A with sodium bicarbonate solution. The resulting solution assayed microbiologically contains 1,530,000 units of activity per ml.

We claim:

1. Compounds of the group consisting of the tetrahydro form of compounds having the structure:

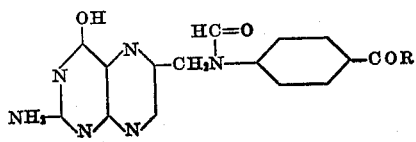

in which —COR is a member of the group consisting of carboxylic acid, carbonylaspartic acid, carbonylglutamic acid, carbonylglutamylglutamic acid, carbonylglutamylglutamylglutamic acid radicals and the cationic salts thereof.

2. Tetrahydro-10-formylpteroylglutamic acid.

3. A process of preparing the tetrahydro form of compounds having the structure:

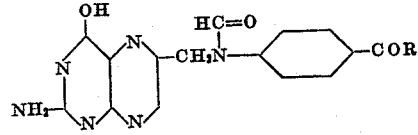

in which COR is a member of the group consisting of carboxylic acid, carbonylaspartic acid, carbonylglutamic acid, carbonylglutamylglutamic acid, carbonylglutamylglutamylglutamic acid radicals which comprises subjecting said compounds to the action of hydrogen until two moles of hydrogen have been absorbed.

4. A process in accordance with claim 3 in which the reducing agent is platinum and hydrogen.

5. A process of preparing tetrahydro-10-formylpteroylglutamic acid which comprises subjecting 10-formylpteroylglutamic acid to the action of hydrogen until two moles of hydrogen have been absorbed.

6. A process which comprises the step of reducing 10-formylpteroylglutamic acid by the action of platinum and hydrogen and recovering tetrahydro-10-formylpteroylgutamic acid therefrom.

7. A process which comprises the step of reducing 10-formylpteroylglutamic acid by the action of platium and hydrogen in the presence of formic acid and recovering tetrahydro-10-formylpteroylglutamic acid therefrom.

8. A compound produced by subjecting 10-formylpteroylglutamic acid to hydrogenation until up to about two molar equivalents of hydrogen, based on the amount of 10-formylpteroylglutamic acid used, is absorbed.

No references cited.